(12) United States Patent
Gora et al.

(10) Patent No.: US 12,338,904 B2
(45) Date of Patent: Jun. 24, 2025

(54) SAFETY VALVE, PNEUMATIC ACTUATOR, AND VEHICLE

(71) Applicant: ZF CV Systems Europe BV, Brussels (BE)

(72) Inventors: Rafal Gora, Wroclaw (PL); Damian Kaszuba, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 18/292,471

(22) PCT Filed: Jul. 29, 2021

(86) PCT No.: PCT/EP2021/071290
§ 371 (c)(1),
(2) Date: Jan. 26, 2024

(87) PCT Pub. No.: WO2023/006207
PCT Pub. Date: Feb. 2, 2023

(65) Prior Publication Data
US 2024/0353017 A1  Oct. 24, 2024

(51) Int. Cl.
*F16K 17/04* (2006.01)
*F15B 13/04* (2006.01)

(52) U.S. Cl.
CPC .......... *F16K 17/04* (2013.01); *F15B 13/0401* (2013.01); *F16K 2200/402* (2021.08)

(58) Field of Classification Search
CPC .................... F16K 17/04; F16K 2200/402
See application file for complete search history.

(56) References Cited

U.S. PATENT DOCUMENTS

| 2,588,157 | A | 3/1952 | Olson |
| 2,601,563 | A | 6/1952 | Selwyn |
| 2003/0172805 | A1 | 9/2003 | Lissel et al. |
| 2013/0233407 | A1 | 9/2013 | Tarczewski et al. |

(Continued)

FOREIGN PATENT DOCUMENTS

| CN | 112268077 A | 1/2021 |
| DE | 102008053994 A1 | 5/2010 |
| EP | 0161348 A2 | 11/1985 |

OTHER PUBLICATIONS

European Patent Office, Rijswijk, Netherlands, International Search Report of International Application No. PCT/EP2021/071290, Mailed Mar. 29, 2022, 4 pages.

*Primary Examiner* — P. Macade Nichols
(74) *Attorney, Agent, or Firm* — Dickinson Wright PLLC

(57) ABSTRACT

A safety valve (100) for a pneumatic conduit (798) includes a valve body (120) having a pressure port (122) pneumatically connected to a pressure side (840) of the pneumatic conduit (798) and a release port (124) pneumatically connected to a release side (860) of the pneumatic conduit (798), a valve piston (140) axially movable along a valve axis (AV) relative to the valve body (120) between a release-side end position (SP1) and a pressure-side end position (SP2), and a valve piston spring (160) that pushes the valve piston (140) into the pressure-side end position (SP2). The safety valve (100) includes a pressure-side gasket (130), which is adapted to inhibit the air flow (AF) between the pressure port (122) and the release port (124) when the valve piston (140) is in the pressure-side end position (SP2).

20 Claims, 7 Drawing Sheets

(56) References Cited

U.S. PATENT DOCUMENTS

2018/0319385 A1    11/2018  Aydemir
2018/0363791 A1    12/2018  Chen et al.
2019/0107218 A1*    4/2019  Kruppe ............... F16K 27/0209

* cited by examiner

SAFETY VALVE, PNEUMATIC ACTUATOR, AND VEHICLE

FIELD

The present disclosure relates to a safety valve for a pneumatic conduit, in particular in a pneumatic actuator. The invention also relates to a pneumatic actuator and a vehicle.

BACKGROUND

Safety valves are generally known. A safety valve ensures a safe operation of a pneumatic system, in particular by enabling a release airflow in the pneumatic system when a pressure threshold is exceeded. Safety valves generally include a valve piston for enabling and blocking such release airflow depending on a pressure in the pneumatic system.

Safety valves have to be reliable, as their function is critical to the safety of the pneumatic system and of a superordinate system such as a vehicle. In particular, a safety valve must reliably switch when a certain, predetermined airflow rate and/or pressure is reached. Another important aspect is the manufacturability, in particular an economical manufacturing, of the safety valve.

Safety valves can still be improved, in particular with respect to a reliable function and/or their manufacturability. It is therefore desirable to address at least one of the above problems.

SUMMARY

It is an object of the present disclosure to specifically improve safety valves with respect to a reliable function and an improved manufacturability.

In accordance with the present disclosure the object is solved in a first aspect by a safety valve as described herein.

A safety valve is provided for a pneumatic conduit, in particular a pneumatic actuator, the safety valve including:
  a valve body, arranged in the pneumatic conduit, the valve body including a pressure port pneumatically connected to a pressure side of the pneumatic conduit and a release port pneumatically connected to a release side of the pneumatic conduit,
  a valve piston, arranged in the valve body and axially movable along a valve axis relative to the valve body between a release-side end position on an axial side facing the release port and a pressure-side end position on another axial side facing the pressure port, and
  a valve piston spring, adapted to push the valve piston into the pressure-side end position.

In accordance with the present disclosure, it is provided that
  the safety valve includes a pressure-side gasket, which is adapted to inhibit the air flow between the pressure port and the release port when the valve piston is in the pressure-side end position.

The present disclosure includes the finding that by way of a pressure-side gasket, which is adapted to inhibit the air flow between the pressure port and the release port when the valve piston is in the pressure-side end position, the safety valve is adapted to close. Such closing is in particular effected when the pressure on the pressure side is below a leakage threshold such as a minimum leakage pressure, and in particular also when the pressure at the pressure port is below an ambient pressure that is present at the release port.

In the latter case, an uncontrolled flow of air in the opposite direction of the release airflow can advantageously be prevented.

Further developments of the present disclosure can be found herein and show particularly advantageous possibilities to realize the above described concept in light of the object of the present disclosure and regarding further advantages.

Preferably, the pneumatic conduit is part of a pneumatic actuator. The pneumatic conduit can preferably be arranged in or at an actuator piston of the pneumatic actuator, pneumatically connecting a pressure side and a release side of the pneumatic actuator. In other preferred developments, the pneumatic conduit is arranged in another part of a pneumatic system, in particular of a pneumatic actuator. A safety valve according to the concept of the present disclosure can be applied in any pneumatic conduit where the achieved flow characteristic of an air flow is needed between a pressure side and a release side.

Developments, in which the pneumatic conduit is part of a pneumatic actuator, include the finding that by enabling the release airflow, an unintended activation of the pneumatic actuator, in particular of a pneumatic clutch, through a leakage airflow is advantageously prevented by the safety valve. By means of a valve piston, that is axially movable along a valve axis relative to the valve body, a simple yet reliable design is achieved for the function of a safety valve.

A safety valve according to the concept of the present disclosure is preferably adapted to inhibit a release airflow from the pressure port to the release port when the pressure at the pressure side is below or equal to a first specified pressure present at the pressure port, in particular below or equal to a minimum leakage pressure.

A safety valve according to the concept of the present disclosure is further preferably adapted to enable the release airflow from the pressure port to the release port when the pressure at the pressure side is between a first and a second specified pressure at the pressure port, in particular between a minimum leakage pressure and a maximum leakage pressure.

A safety valve according to the concept of the present disclosure is further preferably adapted to again inhibit the release airflow when the pressure is equal to or above said specified second pressure, in particular above the maximum leakage pressure.

It is preferably provided that:
  the pressure-side gasket is adapted to inhibit the air flow in an annular passage when the valve piston is in the pressure-side end position, wherein
  the annular passage is between a circumferential surface of the valve piston and an inner surface of the valve body. Preferably, the annular passage is the only passage for the release airflow to pass from the pressure port to the release port.

In accordance with a further development, a release-side gasket is provided, which is adapted to inhibit the release airflow between the pressure port and the release port when the valve piston is in the release-side end position. Through the release-side gasket, a blocking of the release airflow in the release-side end position of the valve piston is advantageously achieved. Preferably, the release-side gasket is arranged on or near the release-side end face of the valve piston. More preferably, the release-side gasket is arranged in a release-side gasket recess, wherein the release-side gasket recess is an axial segment with a reduced diameter for accommodating the release-side gasket at a specified axial position.

It is accordingly advantageous that the pressure-side gasket is arranged between a pressure-side end face of the valve piston and a pressure-side stop of the valve body, in particular protrudes axially in the direction of the valve axis. Through such axial arrangement of the pressure-side gasket, a blocking of the release airflow in the pressure-side end position of the valve piston is advantageously achieved.

A preferred development suggests that the pressure-side gasket is arranged on, in particular molded onto, the pressure-side end face of the valve piston.

Another preferred development suggests that the pressure-side gasket is arranged on, in particular molded onto, a pressure-side stop of the valve body or of the valve body lid.

In accordance with a further development, it is provided that the pressure-side gasket is arranged in the annular passage, in particular extends radially in a plane perpendicular to the valve axis. A development where the pressure-side gasket is arranged in the annular gap is particularly advantageous when the safety valve has a bypass conduit with a circumferentially open cross-section, because the function of the bypass conduit can be effected in dependence of the axial position of the valve piston. When the pressure-side gasket is outside of the axial range of the bypass conduit, in particular when the valve piston is in one of its two end positions, the bypass conduit is not functional and consequently, the release airflow cannot pass.

A preferred development suggests that the pressure-side gasket is arranged on, in particular molded onto, the circumferential surface of the valve piston. Preferably, the pressure-side gasket has a rotationally symmetric shape.

It is preferably provided that:
the safety valve includes a bypass conduit, adapted to permit the air flow to bypass the valve piston and to flow between the pressure port and the release port, wherein
the bypass conduit extends in the valve body, in particular that the bypass conduit is a groove extending axially or in a substantially axial direction on an inner surface of the valve body.

The pressure-side gasket and/or the release-side gasket and/or the lid gasket is preferably made of rubber, in particular silicone.

A preferred development suggests that the valve body includes a valve body lid, which in particular includes the pressure-side stop and/or the pressure port.

In accordance with a further development, it is provided that the valve body lid is releasably connected to the valve body, and in particular includes a lid thread adapted to be engaged to a corresponding body thread of the valve body. With such detachable connection between the valve body lid and the valve body, the valve body can be reopened in a nondestructive manner, for example for repair purposes. In other preferable developments, it is provided that the valve body lid is releasably connected to the valve body by way of a snap-fit connection. In particular, the valve body lid can include a snap hook, adapted to engage with the valve body, in particular with a lid recess.

It is preferably provided that:
the valve body lid is mounted to the valve body in a positively locking manner, in particular axially locked in a lid recess by a body rim, wherein
the body rim is preferably created by a bordering process after inserting the valve body lid into the lid recess.

Preferably, the valve body lid is a washer. A washer is a flat cylindrical disc with a hole extending through it. A washer is a standard part that is available in a great range of sizes. Preferably, the pressure-side gasket is molded onto the washer. By molding the pressure-side gasket onto the washer, the washer as a standard part can be easily modified to become a sealing part in the safety valve. Preferably, the valve body lid, in particular the washer, has an annular gasket recess on the side facing the valve piston. Such annular gasket recess can accommodate the pressure-side gasket and/or can improve the adhesion between the pressure-side gasket and the valve body lid when the pressure-side gasket is molded onto the valve body lid, in particular onto the washer.

In another preferred embodiment, the pressure-side gasket is glued to the valve piston or to the valve body lid, in particular to the washer, by way of an adhesive.

In the context of this application, the molding of a gasket onto a component of the safety valve may be achieved by an injection molding process.

In a particularly preferred development, the pressure-side gasket is arranged on a valve body lid, wherein the valve body lid is a washer that is mounted to the valve body by way of a bordering process, wherein the pressure-side gasket is molded onto the washer.

In another preferred development, a fixation bushing is provided, in particular a nut, adapted to engage with the pneumatic conduit in a positively locking manner, preferably by means of a fixation bushing thread. The fixation bushing is preferably adapted to axially lock the safety valve in the pneumatic conduit, in particular in an actuator piston of a pneumatic actuator. By means of a fixation bushing thread, the fixation bushing can engage with the pneumatic conduit, in particular with an actuator piston, in a releasable manner.

In a second aspect of the present disclosure, a pneumatic actuator, in particular pneumatic clutch actuator or pneumatic transmission actuator, is provided, including a pneumatic conduit with a pressure side and a release side, and a safety valve according to the first aspect of the present disclosure. Preferably, the pneumatic actuator includes an actuator piston. Preferably, the pneumatic conduit is arranged in the actuator piston, wherein consequently the safety valve is arranged in the actuator piston. In other developments of the pneumatic actuator, the pneumatic conduit and/or the safety valve is arranged elsewhere, for example in a housing of the pneumatic actuator or in an electro pneumatic valve module, and connected to the pressure side and/or to the release side by way of a conduit or the like pneumatic connection. In a preferred development of the pneumatic actuator, a fixation bushing is provided, in particular a nut, adapted to engage with the pneumatic conduit in a positively locking manner to axially lock the safety valve in the pneumatic conduit. In a preferred development of the pneumatic actuator, the pneumatic conduit and/or the safety valve is connected to a pressure conduit at a pressure side, preferably at the pressure port of the safety valve. In a preferred development of the pneumatic actuator, the pneumatic conduit and/or the safety valve is connected to a release conduit at a release side, preferably at the release port of the safety valve.

In a third aspect of the present disclosure, a vehicle, in particular a commercial vehicle, is provided, including a pneumatic actuator according to the second aspect of the present disclosure, in particular a pneumatic clutch actuator, and/or a safety valve according to the first aspect of the present disclosure.

It shall be understood that the safety valve according to the first aspect of the present disclosure, the pneumatic actuator according to the second aspect of the present disclosure and the vehicle according to the third aspect of the present disclosure include identical or similar developments, in particular as described throughout herein. Therefore, a development of one aspect of the present disclosure is also applicable to another aspect of the present disclosure.

These and other aspects of the present disclosure will be apparent from and elucidated with reference to the embodiments described hereinafter. The embodiments of the present disclosure are described in the following on the basis of the drawings in comparison with the state of the art, which is also partly illustrated. The latter is not necessarily intended to represent the embodiments to scale. Drawings are, where useful for explanation, shown in schematized and/or slightly distorted form. With regard to additions to the lessons immediately recognizable from the drawings, reference is made to the relevant state of the art. It should be borne in mind that numerous modifications and changes can be made to the form and detail of an embodiment without deviating from the general idea of the present disclosure. The features of the present disclosure disclosed in the description, in the drawings and in the claims may be essential for the further development of the present disclosure, either individually or in any combination.

In addition, all combinations of at least two of the features disclosed in the description, drawings and/or claims fall within the scope of the present disclosure. The general idea of the present disclosure is not limited to the exact form or detail of the preferred embodiment shown and described below or to an object which would be limited in comparison to the object claimed in the claims. For specified design ranges, values within the specified limits are also disclosed as limit values and thus arbitrarily applicable and claimable.

BRIEF DESCRIPTION OF THE DRAWINGS

Further advantages, features and details of the present disclosure result from the following description of the preferred embodiments as well as from the drawings, in which.

DETAILED DESCRIPTION

Figure 1:
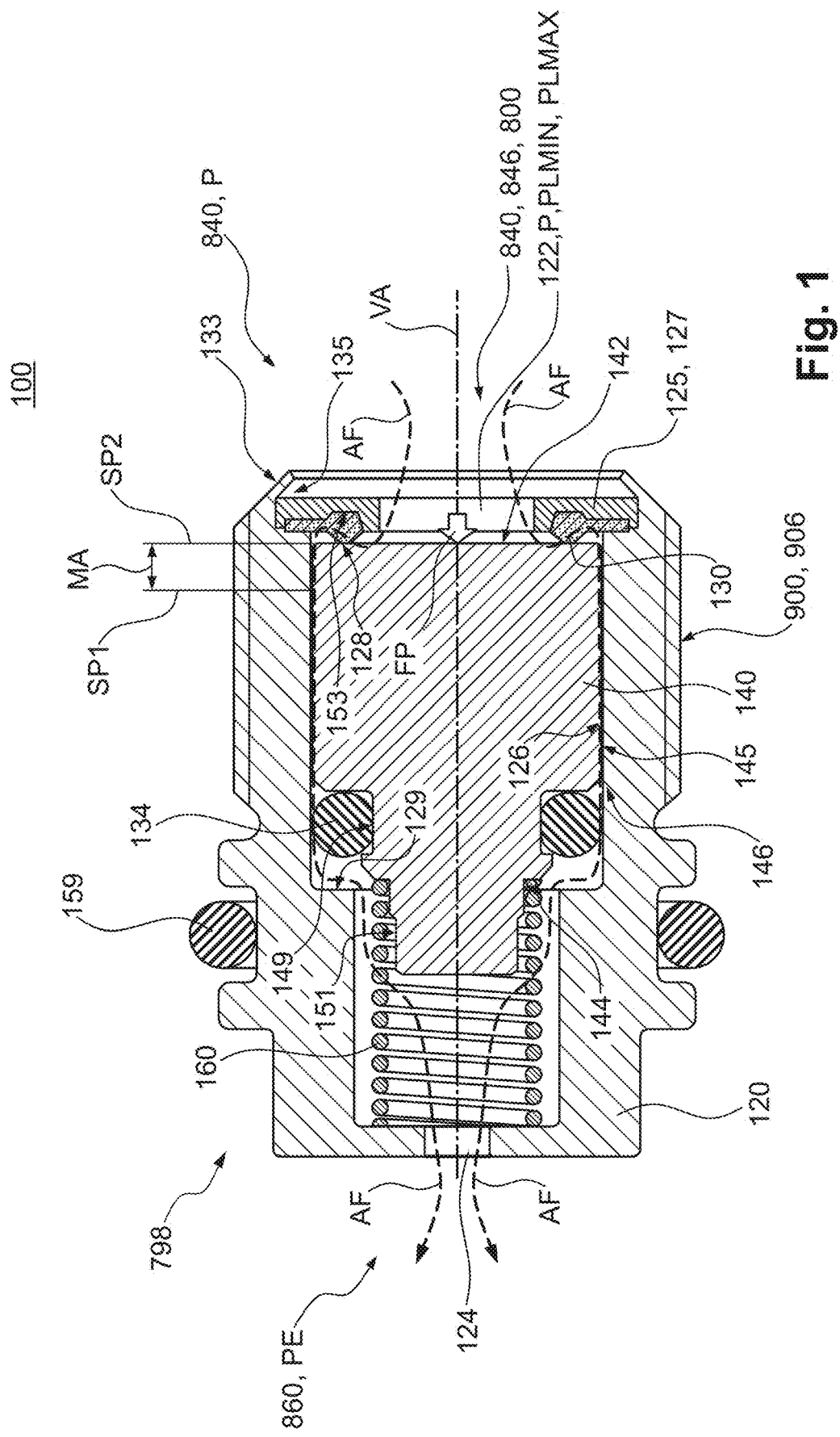
FIG. 1 is a cross-sectional side view of a first preferred embodiment of a safety valve according to the concept of the present disclosure.
Figure 5:
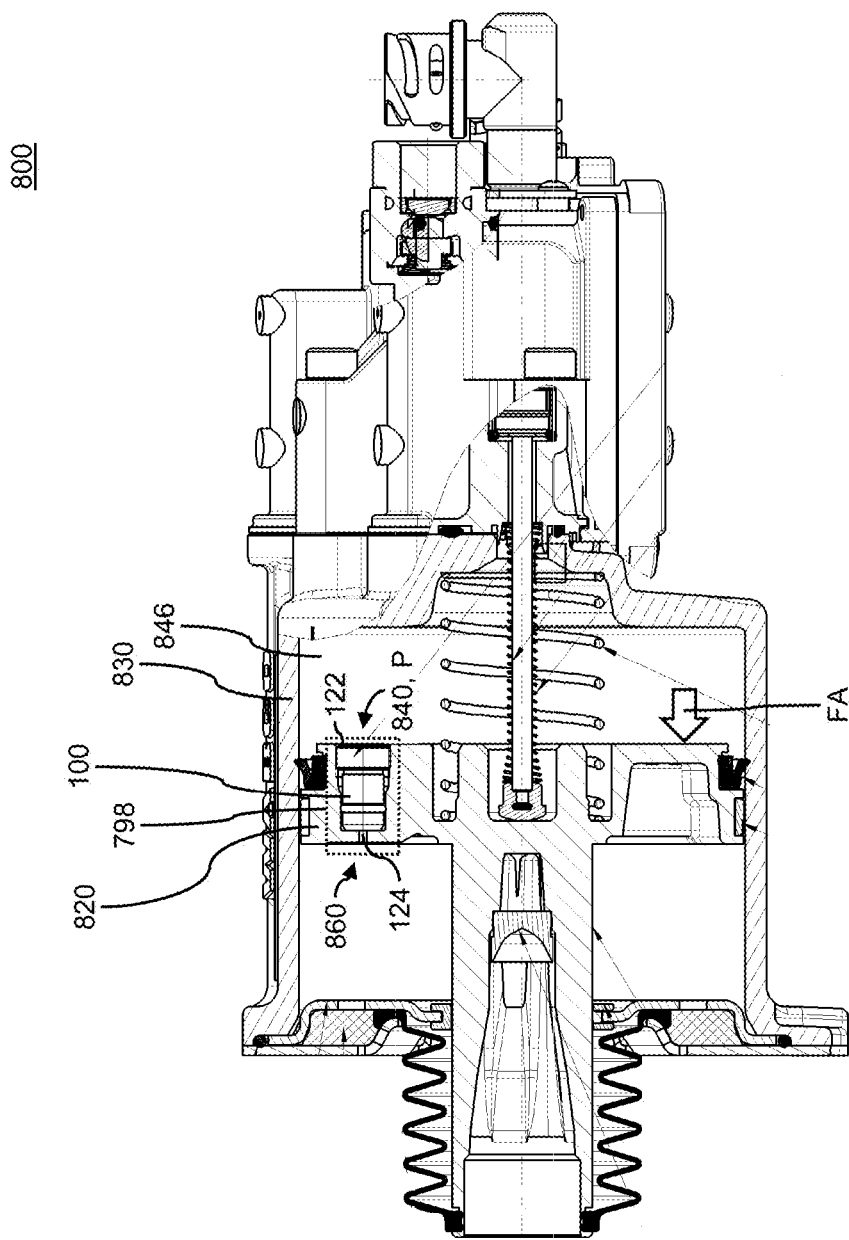
FIG. 5 is a cross-sectional side view of a pneumatic actuator in the form of a pneumatic clutch actuator.
Figure 6:
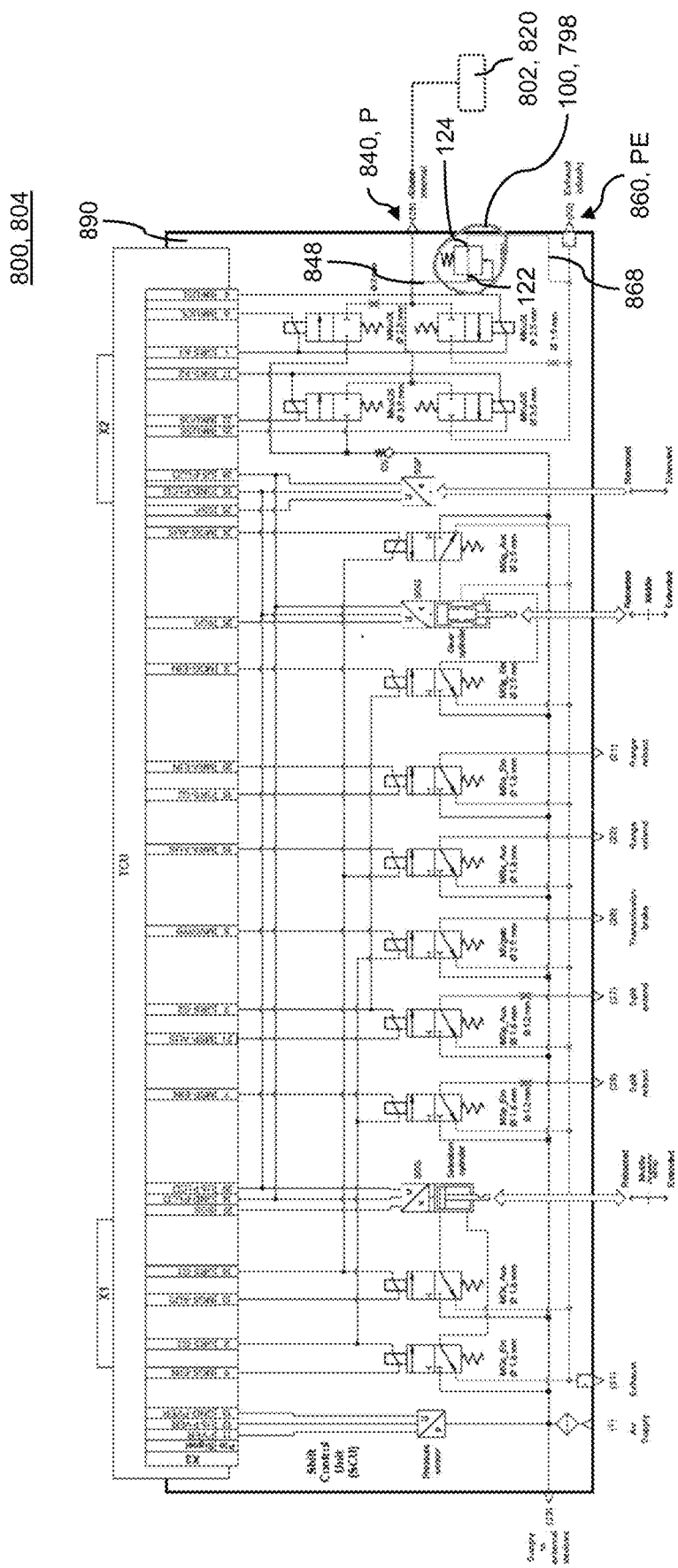
FIG. 6 is an excerpt of another pneumatic actuator with a safety valve, wherein the pneumatic actuator is in the form of a pneumatic transmission actuator.

FIG. 1 shows a first preferred embodiment of a safety valve 100 according to the concept of the present disclosure. The safety valve 100 includes a valve body 120 and a valve piston 140, which are both in principle rotationally symmetrical with respect to a valve axis VA. The safety valve 100 includes on a pressure side 840 a pressure port 122, which is pneumatically connectable to a pressure source for receiving a pressure P, in particular a pressure chamber 846 of a pneumatic actuator 800, such as a pneumatic clutch actuator 802. The safety valve 100 is insertable into a pneumatic conduit 798, in particular of a pneumatic actuator 800, which is not shown here. For example, the pneumatic conduit 798 can be located in an actuator piston 820 as shown in FIG. 5 or in an electro pneumatic valve module 890 as shown in FIG. 6. By providing a pressure P to the pressure side 840 of actuator piston 820 in a controllable manner, the pneumatic actuator 800 can be selectively actuated.

The safety valve 100 includes on a release side 860 a release port 124, which is pneumatically connectable to a release line, in particular to an environment with ambient pressure PE.

The valve piston 140 is held within the valve body 120 in an axially movable manner, adapted to move along the valve axis VA between two axial end positions, namely a first, release-side end position SP1 defined by a release-side stop 129, and a second, pressure-side end position SP2 defined by a pressure-side stop 128.

Between a circumferential surface 145 of the valve piston 140 and an inner surface 126 of the valve body 120, there is an annular gap 146 for enabling a release airflow AF from the pressure port 122 to the release port 124. The annular gap 146 further provides a certain clearance between the valve body 120 and the valve piston 140 to allow for a relative axial movement between the two.

The safety valve 100 further includes a valve piston spring 160, which is arranged inside the valve body 120 and is adapted to push the valve piston 140 into the pressure-side end position SP2.

A pressure P at the pressure port 122 results in a pressure force FP acting on a pressure-side end face 142 of the valve piston 140.

The valve piston spring 160 is configured such that the valve piston 140 lifts from the pressure-side end position SP2 when the pressure P at the pressure port 122 exceeds a minimum leakage pressure PLMIN.

The valve piston spring 160 is further configured such that the valve piston 140 reaches the release-side end position SP1 when the pressure P at the pressure port 122 reaches a maximum leakage pressure PLMAX.

A release airflow AF through the safety valve 100 is therefore enabled when the pressure P is between the minimum leakage pressure PLMIN and the maximum leakage pressure PLMAX.

The valve piston spring 160 has a spring constant 162, which is adapted to fulfill the valve piston spring's 160 characteristics with respect to the minimum leakage pressure PLMIN and the maximum leakage pressure PLMAX.

On or near a release-side end face 144 of the valve piston 140, which is arranged opposite of the pressure-side end face 142, the valve piston 140 includes at least one release-side gasket 134, adapted to sealingly close the release port 124 when the valve piston 140 is in the release-side end position SP1. Here, the release-side gasket 134 is arranged in a release-side gasket recess 149 near the release-side end face 144. The release-side gasket recess 149 is an axial segment with a reduced diameter so as to accommodate the release-side gasket 134. The release-side gasket recess 149 is axially arranged so that the release-side gasket 134 is in contact with the release-side stop 129 when the valve piston 140 is in the pressure-side end position SP2.

The valve piston 140 further includes a spring seat 151, protruding cylindrically from the release-side end face 144, adapted to accommodate the valve piston spring 160. The diameter of the spring seat 151 corresponds to the inner diameter of the valve piston spring 160, such that the valve piston spring 160 can be fixed to the spring seat 151 by way of clamping.

On the pressure side 840, the safety valve 100 includes a pressure-side gasket 130 for sealingly blocking an airflow, in particular the release airflow AF, through the annular passage 146. The blocking is effected when the valve piston 140 is in the pressure-side end position SP2. The pressure-side gasket 130 is attached to a valve body lid 125, which in the present embodiment is formed as a washer 127. The washer 127 is mounted to the valve body 120 in a positively locking manner, here axially locked in a lid recess 135 by means of a body rim 133. Preferably, the body rim 133 is created by a bordering process or the like forming process, after the valve body lid 125 is inserted into the lid recess 135. The valve body lid 125, here the washer 127, includes an annular gasket recess 153 for at least partly accommodating the pressure-side gasket 130. Through such annular gasket recess 153, the adhesion between the valve body lid 125 and the pressure-side gasket 130 can be improved.

In the present embodiment, the pressure-side gasket 130 is molded onto the washer 127. The pressure-side gasket 130 is preferably made of rubber. The pressure-side gasket 130 is overmolded over the washer 127, or as shown here, onto the washer 127.

The inner end face of the valve body lid 125 with the pressure-side gasket 130 facing the valve piston 140 serves as the pressure-side stop 128.

The safety valve 100 further includes a body gasket 159, which is adapted to sealingly insert the valve body 120 into an actuator piston 820 or the like receptacle for the safety valve 100. A body gasket 159 advantageously prevents an airflow between the pressure side 840 and the release side 860 outside of the safety valve 100.

The safety valve 100 functions as follows: when a pressure P in a pneumatic actuator 800, in particular in a pneumatic clutch actuator 802, is below a minimum leakage pressure PLMIN, no airflow AF can pass from the pressure port 122 to the release port 124, since the valve piston 140 is sealingly resting on the pressure-side gasket 130. When the pressure P reaches or exceeds the minimum leakage pressure PLMIN, the pressure force FP is high enough to compress the valve piston spring 160 and lift the valve piston 140 from its pressure-side end position SP2. In such condition, the airflow AF can pass from the pressure port 122 via the annular gap 146 to the release port 124.

Once the rising pressure P reaches or exceeds the maximum leakage pressure PLMAX, the valve piston 140 reaches the release-side end position SP1 (as shown in FIG. 1) and the release airflow AF between the pressure port 122 and the release port 124 is blocked by the release-side gasket 134, sealing off the release port 124. In this case, the pressure P at the pressure port 122 and in the pneumatic actuator 800 can further increase, preferably for actuating a pneumatic system 880 such as a pneumatic clutch 882.

When the pressure P is below the ambient pressure PE, i.e. an underpressure is present at the pressure port 122, the resulting pressure force FP acts in the opposite direction, pushing the valve piston 140 onto the pressure-side gasket 130. Thereby, any airflow opposite of the direction of the release airflow AF is prevented.

The valve body includes a fixation thread 906 for positively locking the safety valve 100 in the pneumatic conduit 798 at an interface 900 between the valve body 120 and the pneumatic conduit 798.

Figures 2A, 2B:
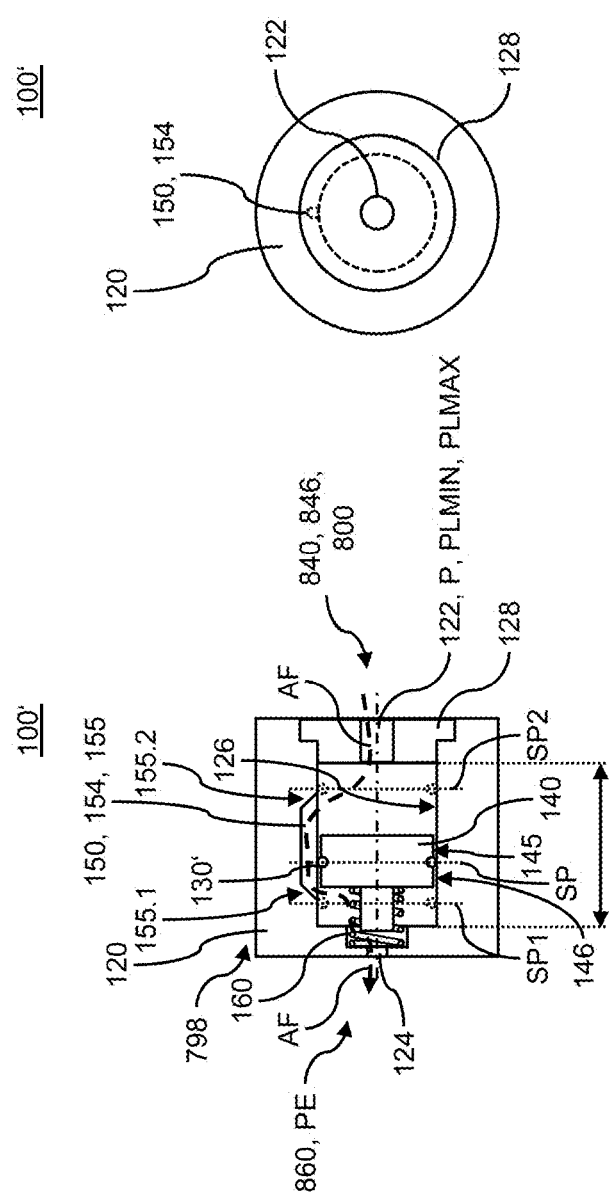
FIG. 2A is a cross-sectional side view of a second preferred embodiment of a safety valve according to the concept of the present disclosure.
FIG. 2B is an end view of the safety valve of FIG. 2A.

FIG. 2A and FIG. 2B show a second preferred embodiment of a safety valve 100' according to the concept of the present disclosure. The safety valve 100' is shown in a schematic cross-sectional side view in FIG. 2A.

Compared to the first embodiment of the safety valve 100, the second embodiment of the safety valve 100' includes a bypass conduit 150. The bypass conduit 150 has a circumferentially open cross-section 154. The term "circumferentially open cross-section" means that the cross-section of the bypass conduit 150 is not completely enclosed by material, as the bypass conduit 150 extends along a surface, resulting in a channel open on at least one side, such as a groove. In the embodiment shown, the bypass conduit 150 is in the form of a groove 155 extending parallel to the valve axis VA along an inner circumferential surface 126 of the valve body 120. The groove 155 extends from a release-side conduit end 155.1 to a pressure-side conduit end 155.2.

The axial dimension and arrangement of the groove 155 is such that the pressure-side gasket 130' exceeds the pressure-side conduit end 155.2 when the valve piston 140 travels to the pressure-side end position SP2, and also such that the pressure-side gasket 130' exceeds the release-side conduit end 155.1 when the valve piston 140 travels to the release-side end position SP1. Consequently, no airflow, in particular no release airflow AF, between the pressure port 122 and the release port 124 is possible when the valve piston is either in the release-side end position SP1 or in the pressure-side end position SP2.

By blocking the release airflow AF also in the pressure-side end position SP2, the second embodiment also advantageously inhibits any airflow AF, in particular in an opposite direction from the release port 124 to the pressure port 122, for example when the pressure P at the pressure port 122 is below the ambient pressure PE. In this case, the valve piston 140 is in the pressure-side end position SP2, sealing the pressure port 122 and preventing any airflow through the pressure port 122 into the pneumatic actuator 800.

In other words, the bypass conduit 150 in the form of the groove 155 is only functional (i.e. only permits an airflow) when the valve piston 140 is in between its two end positions SP1, SP2.

As a further difference to the first embodiment, the safety valve 100' includes—instead of a pressure-side gasket 130—a pressure-side gasket 130' which is arranged on an outer circumferential surface 145 of the valve piston 140.

Due to the form of the bypass conduit 150 with the open cross-section 154 and the pressure-side gasket 130' moving relative to the bypass conduit 150, no further gasket, in particular no release-side gasket 134, is needed.

Figure 3:
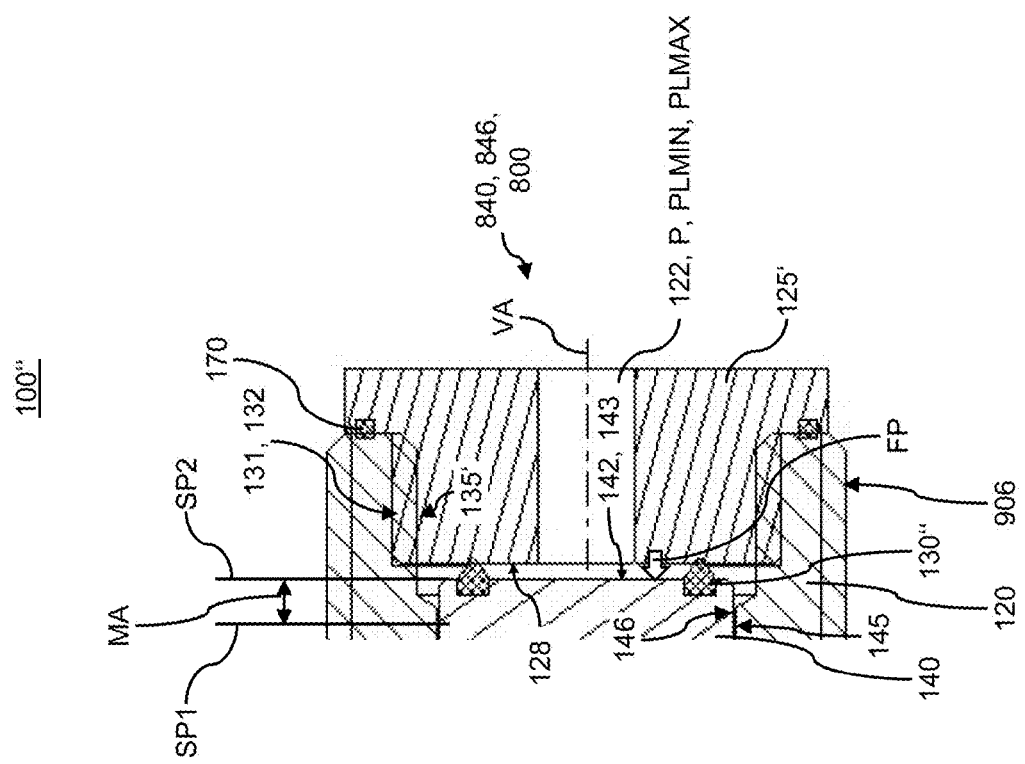
FIG. 3 is a partial cross-sectional side view shows an excerpt of a third preferred embodiment of a safety valve.

FIG. 3 shows an excerpt of a third preferred embodiment of a safety valve 100", including an alternative pressure-side gasket 130" which is a sealing ring molded onto the pressure-side end face 142. The alternative pressure-side gasket 130" adapted to sealingly close the pressure port 122, in particular pneumatically separate the pressure port 124 from the annular gap 146, when the valve piston 140 is in the pressure-side end position SP2.

The safety valve 100" further includes a valve body lid 125', which is releasably attached to the valve body 120 by way of a threaded connection. The valve body 120 has on the pressure side 840 a lid recess 135', adapted to hold the valve body lid 125'. The lid recess 135' includes on its inner circumferential surface a body thread 132, which is adapted to engage with a corresponding lid thread 131 of the valve body lid 125'. The inner end face of the valve body lid 125' facing the valve piston 140 serves as the pressure-side stop 128.

The safety valve 100″ further includes a lid gasket 170, which is adapted to sealingly connect the valve body lid 125′ to the valve body 120 when both are mounted together.

Figure 4:
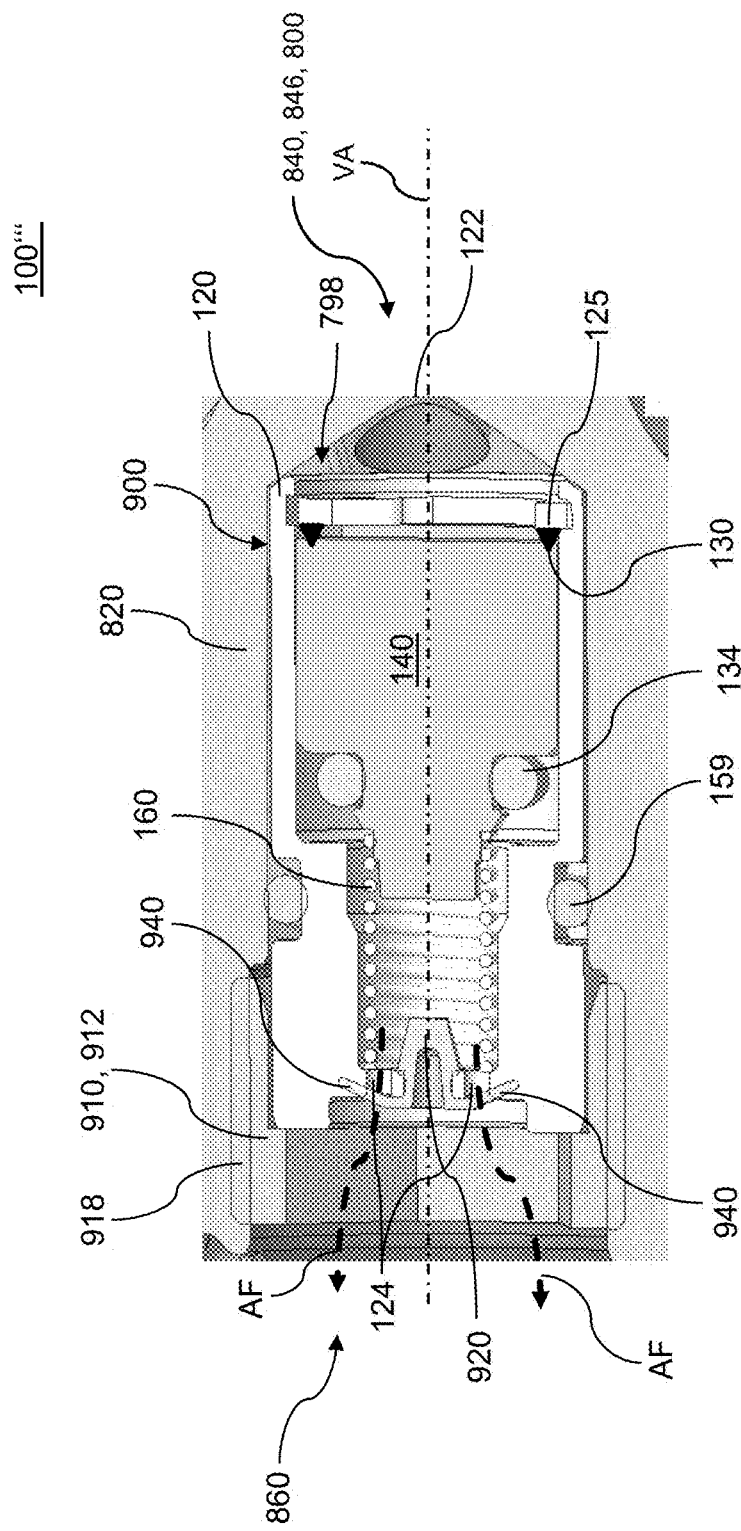
FIG. 4 is a cross-sectional side view of a fourth preferred embodiment of a safety valve according to the present disclosure.

FIG. 4 shows a fourth preferred embodiment of a safety valve 100‴ according to the present disclosure.

As shown in FIG. 4, safety valve 100‴ includes a fixation bushing 910 made of e.g., a coated steel or steel. In the same embodiment, valve body 120 is made of aluminum. The fixation bushing 910 is adapted to engage with the pneumatic conduit 798 in a positively locking manner, here by way of a fixation bushing thread 918. The fixation bushing 910 is inserted into the pneumatic conduit 798, thereby axially locking the safety valve 100 in the pneumatic conduit 798. Preferably, the axial locking is such that substantially no axial clearance is left for the valve body 120 to move along the valve axis VA. In particular, the pneumatic conduit 798 is arranged in an actuator piston 820 of a pneumatic actuator 800.

Conventionally, valve body 120 is assembled in e.g., pneumatic conduit 798 using a threaded connection at an interface 900 (see also e.g., FIG. 1). However, it has been noticed that, due to existing difference in the material hardness at interface 900 between valve body 120 and pneumatic conduit 798, chips or powder of material from valve body 120 were/was found over a period of time of usage. Such formation of powder or chips of e.g., aluminum at interface 900 (a region where valve body 120 is assembled with actuator piston 820) is naturally disadvantageous as any miniscule passage of the pressurized air at interface 900 can carry these chips or powder of e.g., Aluminum towards release side 860.

In order to address this problem, the present disclosure, in accordance with the present embodiment, provides for a fixation bushing 910, in particular a nut 912, assembled or provided between valve body 120 and pneumatic conduit 798. Consequently, there is no threaded connection provided at interface 900 between valve body 120 and pneumatic conduit 798. As can be derived, this is advantageous during the assembly of valve body 120 or rather entire safety valve 100″ with pneumatic conduit 798, in particular with actuator piston 820. As a sequence, safety valve 100″ is firstly inserted into pneumatic conduit 798, and thereafter, fixation bushing 910 is inserted and tightened. As can be derived, there is a threaded interface between fixation bushing 910 and pneumatic conduit 798 in the form of a fixation bushing thread 918, in accordance with the present embodiment. Furthermore, safety valve 100″ of the present embodiment, shows an elastomeric check valve 920 facing release port 124. In FIG. 4, air flow "AF" represents unidirectional flow of air allowed by elastomeric check valve 920. As can be seen in FIG. 4, flaps 940 of elastomeric check valve 920 open selectively to enable (unidirectional) air flow "AF" and prevent any return flow in the opposite direction to "AF" towards spring 160.

FIG. 5 shows a pneumatic actuator 800 in the form of a pneumatic clutch actuator 802. A safety valve 100 according to the concept of the present disclosure, in particular all of the shown embodiments of a safety valve 100, 100′, 100″, 100‴ can be applied in the shown pneumatic actuator 800. The pneumatic clutch actuator 802 includes an actuator piston 820, which is axially movable within an actuator body 830. The actuator piston 820 has a pressure side 840 facing a pressure chamber 846 of the pneumatic actuator 800. When a pressure P is applied on the pressure side 840 of the actuator piston 820, an actuation force FA results, acting on the actuator piston 820. Consequently, an actuation is effected by moving the actuator piston 820. The actuator piston 820 has a release side 860 on the opposite side of the pressure side 840. A safety valve 100 according to the concept of the present disclosure is arranged in the actuator piston 820, with its pressure port 122 facing the pressure side 840 and its release port 124 facing the release side 860.

A safety valve 100 according to the concept of the present disclosure, in particular all of the shown embodiments of a safety valve 100, 100′, 100″, 100‴ can be applied in other pneumatic actuators 800, in particular can be arranged in a place other than an actuator piston 820, for example in a receptacle in a housing of the pneumatic actuator 800. In such cases, the safety valve can be pneumatically connected to the pressure side 840 and/or the release side 860 by means of pneumatic passages or conduits, such as a pressure conduit 848 and/or a release conduit 868 as shown in FIG. 6.

The previous figures illustrate use of safety valve 100, 100′, 100″ or 100‴ within pneumatic clutch actuator 802 only for the sake of exemplary illustration. It is noted however, that safety valve 100, 100′, 100″ or 100‴ can be used in another pneumatic conduit 798, for instance, as part of a pneumatic transmission actuator 804 (shown in FIG. 6) or gearbox actuator where it forms part of an interface between a closed space within said pneumatic transmission or gearbox actuator and atmosphere, in order to relieve pressure from the closed space when a predetermined pressure is achieved. In case of using safety valve 100, 100′, 100″ or 100‴ as part of the pneumatic transmission actuator, safety valve 100, 100′, 100″ or 100‴ need not be provided as part of an actuator piston of the transmission actuator. For instance, safety valve 100 can be part of various inlets and/or outlets within the transmission actuator that interacts with the external atmosphere.

FIG. 6 shows an excerpt of another example of an electropneumatic actuator 800 with a safety valve 100, wherein the electropneumatic actuator 800 is in the form of a pneumatic transmission or gearbox actuator 804 used in association with a vehicle gearbox, in a pneumatic diagram. In the shown embodiment, the safety valve 100 is not arranged in an actuator piston 820, but in an electro pneumatic valve module 890 as a part of the electropneumatic actuator 800. The safety valve 100 (explained in various embodiments) is arranged in a pneumatic conduit 798 in the electro pneumatic valve module 890 (extending from a pressure side 840). The pneumatic conduit 798, and consequently also the safety valve 100, is pneumatically connected to the pressure side 840 by means of a pressure conduit 848. Preferably, the pressure conduit 848 is pneumatically connected to the pressure side 840 of an actuator piston 820, for example of a pneumatic clutch actuator 802 arranged outside of the electro pneumatic valve module 890, as shown here. The pneumatic conduit 798, and consequently also the safety valve 100, is pneumatically connected to a release side 860 by means of a release conduit 868. An exemplary general working principle of pneumatic actuator 800 is discussed herewith.

In accordance with the present example as shown in FIG. 6, the electropneumatic valve module 890 is controlled by an Electronic Control Unit 890.5, which is configured to at least transmit electronic control signals to individual valves 890.2 and 890.3. Inlet solenoid valves are labeled in FIG. 6 as 890.2 whereas exhaust solenoid valves labeled as 890.3. Both inlet and exhaust solenoid valves 890.2 and 890.3 receive control signals to open/close from ECU 890.5 depending on whether pneumatic clutch actuator 802 needs to be activated or deactivated.

A pneumatic inlet 890.1 receives pressurized pneumatic air and passes through firstly, inlets of inlet solenoid valves 890.2, which are shown in a closed state in FIG. 6. The outlets of inlet solenoid valves 890.2 lead to both pressure side 840 as well as to inlets of exhaust solenoid valves 890.3. In the illustrated example, exhaust solenoid valves 890.2 are also shown in a closed state. If exhaust solenoid valves 890.3 are in open state, the pressurized air present in the line indicated as pressure side 840 and/or in the outlets of inlet solenoid valves 890.2 are connected to release side or exhaust 860 via exhaust lines 890.4.

In accordance with the present example, in order to maintain pressure at pressure side 840 (connection line to actuator 802), safety valve 100 is provided at pressure conduit 848. When the residual or remaining pressure in conduit 848 is above a certain threshold, safety valve 100 opens and a connection is established between conduits 848 and 868 and/or release port 124 of safety valve 100. Thereafter said residual or remaining pressure is exhausted at release side 860. In the present example, there are two inlet solenoid valves 890.2 and two exhaust solenoid valves 890.3 are shown for the sake of illustration. However, a simplified construction with one inlet and one exhaust solenoid along with safety valve 100 can also be envisaged by the skilled person.

Figure 7:
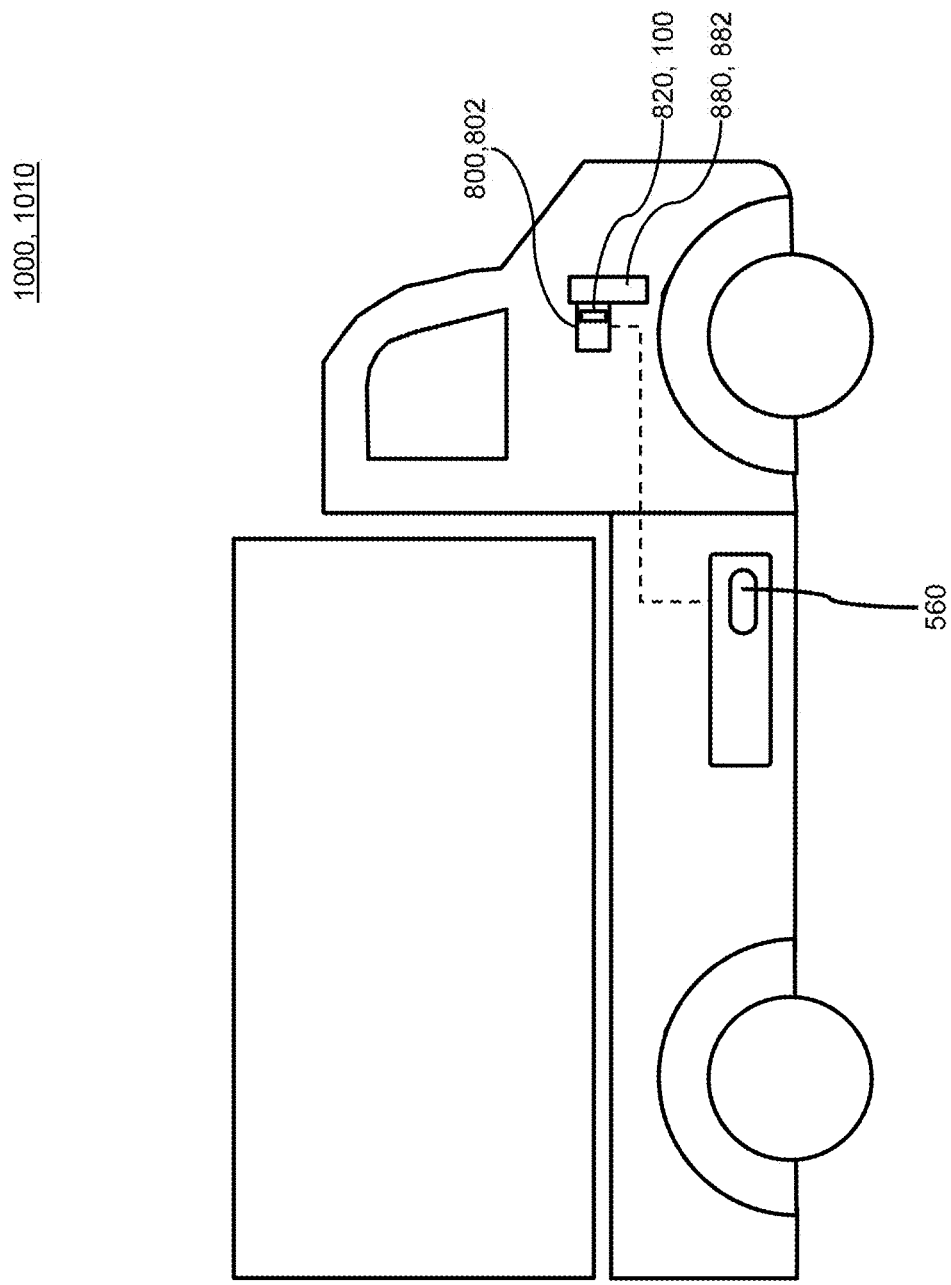
FIG. 7 is a schematic view of a vehicle having a pneumatic actuator with a safety valve according to the concept of the present disclosure.

FIG. 7 schematically shows a vehicle 1000 in the form of a commercial vehicle 1010, comprising a pneumatic actuator 800 in the form of a pneumatic clutch actuator 802 with a safety valve 100 according to the concept of the present disclosure. The pneumatic clutch actuator 802 includes an actuator piston 820 for actuating a pneumatic system 880 such as a pneumatic clutch 882. The pneumatic clutch actuator 802 is pneumatically connected to a pressurized air supply unit 560.

LIST OF REFERENCE SIGNS (PART OF THE DESCRIPTION)

100, 100', 100'', 100''' safety valve
120 valve body
122 pressure port
124 release port
125, 125' valve body lid
126 inner surface of the valve body
127 washer
128 pressure-side stop
129 release-side stop
130, 130', 130'' pressure-side gasket
131 corresponding lid thread
132 body thread
133 body rim
134 at least one release-side gasket
135, 135' lid recess
140 valve piston
142 pressure-side end face
144 release-side end face
145 circumferential surface of the valve piston
146 annular gap
149 release-side gasket recess
150 bypass conduit
151 spring seat
153 annular gasket recess
154 circumferentially open cross-section
155 groove
155.1 release-side conduit end
155.2 pressure-side conduit end
159 body gasket
160 valve piston spring
162 spring constant
170 lid gasket
560 pressurized air supply unit
798 pneumatic conduit
800 pneumatic actuator
802 pneumatic clutch actuator
804 pneumatic transmission actuator
820 actuator piston
830 actuator body
840 pressure side
846 pressure chamber
848 pressure conduit
860 release side
868 release conduit
880 pneumatic system
882 pneumatic clutch
890 electro pneumatic valve module
890.1 pneumatic inlet
890.2 inlet solenoid valves
890.3 outlet solenoid valves
890.4 exhaust or outlet lines from outlet solenoid valves 890.3
890.5 Electronic Control Unit (ECU)
900 interface
906 fixation thread
910 fixation bushing
912 nut
918 fixation bushing thread
920 elastomeric check valve
930 slot within actuator piston 820
940 flaps of elastomeric check valve 920
1000 vehicle
1010 commercial vehicle
AF release airflow
FA actuation force
FP pressure force
P pressure
PE ambient pressure
PLMAX maximum leakage pressure
PLMIN minimum leakage pressure
VA valve axis

The invention claimed is:

1. A safety valve for a pneumatic conduit (798), the safety valve (100) comprising:
   a valve body (120), arranged in the pneumatic conduit (798), the valve body including a pressure port (122) pneumatically connected to a pressure side (840) of the pneumatic conduit (798) and a release port (124) pneumatically connected to a release side (860) of the pneumatic conduit (798),
   a valve piston (140), arranged in the valve body (120) and axially movable along a valve axis (AV) relative to the valve body (120) between a release-side end position (SP1) on an axial side facing the release port (124) and a pressure-side end position (SP2) on another axial side facing the pressure port (122), and
   a valve piston spring (160) that pushes the valve piston (140) toward the pressure-side end position (SP2),
   wherein the safety valve includes a pressure-side gasket (130, 130', 130''), which inhibits the air flow (AF) between the pressure port (122) and the release port (124) when the valve piston (140) is in the pressure-side end position (SP2).

2. A safety valve according to claim 1, wherein
the pressure-side gasket (130, 130") inhibits the air flow (AF) in an annular passage (146) when the valve piston (140) is in the pressure-side end position (SP2), wherein
the annular passage (146) is between a circumferential surface (145) of the valve piston (140) and an inner surface (126) of the valve body (120).

3. A safety valve according to claim 2, further comprising
a release-side gasket (134), which inhibits the release airflow (AF) between the pressure port (122) and the release port (124) when the valve piston (140) is in the release-side end position (SP1).

4. A safety valve according to claim 1, wherein
the pressure-side gasket (130, 130") is arranged between a pressure-side end face (142) of the valve piston (140) and a pressure-side stop (128) of the valve body (120), and protrudes axially in the direction of the valve axis (AV).

5. A safety valve according to claim 4, wherein
the pressure-side gasket (130, 130") is arranged on the pressure-side end face (142) of the valve piston (140), or
the pressure-side gasket (130, 130") is arranged on a pressure-side stop (128) of the valve body (120) or of a valve body lid (125).

6. A safety valve according to claim 1, wherein
the pressure-side gasket (130) is arranged in the annular passage (146), and protrudes radially in a plane perpendicular to the valve axis (VA).

7. A safety valve according to claim 6, wherein
the pressure-side gasket (130') is arranged on the circumferential surface (145) of the valve piston (140).

8. A safety valve according to claim 7, wherein
the safety valve (100') includes a bypass conduit (150), which permits the air flow (AF) to bypass the valve piston (140) and to flow between the pressure port (122) and the release port (124), wherein
the bypass conduit (150) extends in the valve body (120), wherein the bypass conduit (150) is a groove (154) extending axially or in a substantially axial direction on an inner surface (126) of the valve body (120).

9. A safety valve according to claim 1, wherein
the valve body (120) includes a valve body lid (125, 125'), which includes the pressure-side stop (128) and/or the pressure port (122).

10. A safety valve according to claim 9, wherein
the valve body lid (125') is releasably connected to the valve body (120) and includes a lid thread (131) that engages a corresponding body thread (132) of the valve body (120).

11. A safety valve according to claim 9, wherein
the valve body lid (125) is mounted to the valve body (120) in a positively locking manner in a lid recess (135) by a body rim (133), wherein
the body rim (133) is created by a bordering process after inserting the valve body lid (125) into the lid recess (135).

12. A safety valve according to claim 1, further comprising
a fixation bushing (910) that engages with the pneumatic conduit (798) in a positively locking manner via a fixation bushing thread (918), and which axially locks the safety valve in the pneumatic conduit (798).

13. A pneumatic actuator (800) comprising:
a pneumatic conduit (798) with a pressure side (840) and a release side (860), and
a safety valve according to claim 1.

14. A vehicle (1000) comprising a pneumatic actuator (800) according to claim 13.

15. The safety valve of claim 2, wherein the annular passage is the only passage for the release airflow to pass from the pressure port to the release port.

16. The safety valve of claim 3, wherein the release-side gasket is arranged in a release-side gasket recess, wherein the release-side gasket recess is an axial segment with a reduced diameter for accommodating the release-side gasket at a specified axial position.

17. The safety valve of claim 12, wherein the valve body is not in threaded engagement with the pneumatic conduit.

18. The safety valve of claim 12, further comprising a check valve disposed between the valve body and the fixation bushing at the release port, which permits the air flow out through the release port and blocks return flow.

19. The safety valve according to claim 1, wherein the valve piston permits the release airflow (AF) to flow from the pressure port (122) to the release port (124) depending on the position of the valve piston, wherein the release airflow (AF) is blocked from flowing through the release port when the valve piston is in the release-side end position and when the valve piston is in the pressure-side end position, wherein the release airflow is permitted when the valve piston is between the release-side end position and the pressure-side end position.

20. The safety valve according to claim 8, wherein the bypass conduit permits the release airflow when the valve piston is between its two end positions, and the pressure-side gasket (130') blocks the release airflow from the pressure port to the release port when the valve piston is in the release-side end position and when the valve piston is in the pressure-side end position.

* * * * *